United States Patent [19]

Shintani et al.

[11] 4,264,347

[45] Apr. 28, 1981

[54] METHOD OF FABRICATING OPTICAL FIBER PREFORMS

[75] Inventors: Takeshi Shintani, Amagasaki; Atsushi Utsumi, Kawanishi; Tadaaki Sukawa, Hasuda; Ryuji Kobayashi, Urawa, all of Japan

[73] Assignees: Ltd. Dainichi-Nippon Cables, Amagasaki; Mitsubishi Metal Corporation, Tokyo, both of Japan

[21] Appl. No.: 94,499

[22] Filed: Nov. 15, 1979

[30] Foreign Application Priority Data

Dec. 29, 1978 [JP] Japan ................................ 53-165302

[51] Int. Cl.$^3$ ............................................. C03C 25/02
[52] U.S. Cl. ....................................... 65/3 A; 65/4 B; 65/13; 65/30 R; 65/32
[58] Field of Search ...................... 65/3 A, 4 B, 13, 2, 65/30 R, 32

[56] References Cited

U.S. PATENT DOCUMENTS

| 4,123,483 | 10/1978 | Nakahara et al. | 65/3 A X |
| 4,161,505 | 7/1979 | Shiraishi et al. | 65/3 A X |

FOREIGN PATENT DOCUMENTS

| 2434717 | 3/1975 | Fed. Rep. of Germany | 65/3 A |
| 1435523 | 5/1976 | United Kingdom | 65/3 A |

Primary Examiner—Robert L. Lindsay, Jr.
Attorney, Agent, or Firm—Armstrong, Nikaido, Marmelstein & Kubovcik

[57] ABSTRACT

An improved method of preparing optical fiber preforms and optical fibers by so called rod-in-tube method, wherein before collapsing a tube to heat-adhere to a rod, a specific glass surface treating agent and oxygen gas are flowed through the clearance between the rod and the tube maintained at a high temperature, whereby an optical fiber preform free from imperfections at the interface between the rod and the tube can be produced so as to give optical fibers of low-loss. As the above glass surface treating agent, those materials are employed which satisfy the following criteria: (i) the hydrogen content thereof being not more than about 1% by weight, and (ii) the substances, produced therefrom in the presence of oxygen gas at a high temperature, having a boiling point or sublimation point of not more than the temperature required for collapsing the tube.

13 Claims, No Drawings

METHOD OF FABRICATING OPTICAL FIBER PREFORMS

BACKGROUND OF THE INVENTION

The present invention relates to improvements in the rod-in-tube method (hereinafter referred to as "RT method") of fabricating the preforms of optical fibers from silicate glass.

Optical fibers are produced usually by preparing a preform, and heating and drawing the preform. The characteristics of optical fibers are almost dependent on the characteristics of the preform unless the preform is drawn by an improper technique.

Generally known as methods of fabricating optical fiber preforms are the chemical vapor deposition method (CVD method) and the RT method. As disclosed in Japanese Patent Publication (Tokkyo Kokoku) No. 29953/1976, the CVD method comprises the steps of depositing a thin cladding layer on the inner surface of a silicate glass tube, depositing on the cladding layer a thin core layer having a higher index of refraction than that of the cladding layer, and collapsing the resulting tube by heating to a solid preform free from any interior space. Presently this method is most widely used for the preparation of optical fiber preforms and has the advantage of being capable of fabricating low-loss optical fibers. The CVD method, however, requires repetition of the vapor deposition step a large number of times, for example, 50 to 100 times, and is therefore low in production speed. Especially if it is desired to obtain preforms for giving optical fibers with outstanding transmission characteristics and high stability, it is difficult to provide an increased amount of deposition at a time for forming the core layer. Thus the method involves limitations on the size of preforms and on the length of fibers available. Since increased optical losses will result from connection of optical fibers if they are low in dimensional accuracy, for example, the core is eccentric relative to the cladding or has low circularity, the CVD method must be practiced under strictly controlled conditions to overcome the difficulties encountered in producing preforms with increased dimensional accuracy, namely with sufficiently high core circularity and reduce core eccentricity. For these reasons, the CVD method still remains to be improved in its amenability to the quantity production of preforms, yield and accordingly manufacturing cost.

According to the RT method which is known for a long time, a glass rod serving as a core is inserted into a glass tube useful as a cladding, and the assembly is heated to a high temperature so that the tube is collapsed to heat-adhere to the rod, yielding an optical fiber preform. Since the rod having accurate dimensions and the tube are merely thus heat-adhered into a preform, it is easy with the RT method to obtain preforms in large sizes, with high dimensional accuracy and relatively free of the problems, such as core eccentricity and low core circularity, which are inherent in the CVD method. With respect to the dimensional accuracy, therefore, the method affords products in increased yields with reduced product-to-product or lot-to-lot dimensional variations even when performed for mass production. However, the RT method has a serious drawback. It is difficult to prepare preforms in which the interface between the rod and the tube is free from irregularities such as voids and foreign matters. Those irregularities, especially voids, would cause light scattering losses in the resulting optical fiber. This leads to difficulty in producing low-loss optical fibers which are comparable to those obtained by the CVD method.

Whereas research has been directed also to the RT method in an attempt to provide preforms free from imperfections at the interface between the rod and the tube, none of the proposals heretofore made have proved fully satisfactory in the reduction of losses as will be described below.

For example, it has been proposed to clean the surfaces of the rod and the tube with hydrofluoric acid, hot hydrogen fluoride gas or a mixture of hydrogen chloride and helium before the rod and the tube are heat-adhered together, but this method is unable to remove extraneous matter such as carbon particles and is ineffective for diminishing scattering losses due to the presence of irregularities at the interface between the core and the tube. Additionally when hydrogen fluoride gas or like hydrogen-containing gas is used at a high temperature, OH group derived from the hydrogen contained in the gas will be incorporated in various forms into the rod and the tube, entailing an increased absorption loss.

It has also been proposed to pass oxygen gas through the clearance between a rod and a tube maintained at a high temperature of about 1,500° C. to remove foreign matter from the opposed surfaces of the rod and the tube by decomposing and/or oxidizing the foreign matter and thereafter heat-adhering the rod and the tube. With this method, the foreign matter or the resulting oxide, when having a boiling point higher than the above high temperature, will not be thoroughly removed but remain between the rod and the tube. The method is also ineffective for sufficiently reducing the scattering loss attributable to interface irregularities such as voids.

Thus it has been thought that despite various attempts, the RT method has difficulties in producing low-loss optical fibers such as those prepared by the CVD method although having the advantage of affording optical fiber preforms in large sizes with high dimensional accuracy.

OBJECTS OF THE INVENTION

It is an object of the present invention to provide an improved RT method of producing an optical fiber preform free from imperfections at the interface between the rod and the tube, which are capable of giving low-loss optical fibers comparable to those prepared by the CVD method, to thereby remedy the drawback of the existing RT method.

This and other objects of the invention will become apparent from the description hereinafter.

DETAILED DESCRIPTION

It has now been found that the above-mentioned objects can be accomplished by a method of preparing optical fiber preforms by inserting a silicate glass rod into a silicate glass tube and collapsing the tube by heating the resulting assembly, the method being characterized in that before the tube is collapsed, a glass surface treating agent and oxygen gas are flowed through the clearance between the rod and the tube while the rod and the tube are being heated at a high temperature, said glass surface treating agent satisfying the following criteria: (i) the hydrogen content thereof being not more than about 1% by weight, and (ii) the substances, produced therefrom in the presence of oxygen gas at a high temperature, having a boiling point or sublimation point of not more than the temperature required for collapsing the tube.

With use of the novel surface treating technique which appears inconceivable from the conventional techniques, the present invention has overcome the drawback of the RT method by realizing a rod-tube-interface free from imperfections to reduce the marked interface scattering losses that would result from such imperfections, thus enabling the RT method, for the first time, to produce low-loss optical fibers which are comparable to those produced by the CVD method. In fact, the present invention makes full use of the advantage of the RT method that optical fiber preforms of large sizes are available relatively easily with high dimensional accuracy and accordingly assures efficient production of low-loss optical fibers in high yields with greater ease. The invention therefore provides an outstanding technique for the quantity production of low-loss optical fibers.

According to this invention, the above-mentioned glass surface treating agent and oxygen gas are flowed through the clearance between the rod and the tube to treat the opposed surfaces thereof at a high temperature before the rod and tube are united by heating. After the surface treatment, the tube is collapsed and joined to the rod to give an optical fiber preform.

When the glass surface treating agent and oxygen gas are flowed through the clearance between the rod and the tube while the rod and the tube are being heated at a high temperature, the substance produced from the agent at the high temperature in the presence of oxygen gas is incorporated into each of the opposed surface layers of the rod and the tube.

The silicate glass rod and the silicate glass tube to be used in this invention are made from pure silicate glass, or silicate glass doped by a known method with at least one dopant such as $GeO_2$, $P_2O_5$, $TiO_2$, $B_2O_3$, F or the like so as to have varying refractive indexes. Doping methods and dopants are disclosed, for example, in Japanese Patent Publication (Tokkyo Kokoku) No. 23185/1976, Japanese Patent Application Disclosure (Tokkyo Kokai) Nos. 120352/1975 and 35654/1977, etc. The rod may serve, in its entirety, as the core of the optical fiber, or may be provided with an outer peripheral layer serving as part of the cladding of the fiber. The rod may provide a core of the step-index type or the graded-index type. The tube may serve, in its entirety, as the cladding of the optical fiber, or may comprise an inner layer for providing the cladding of the fiber and an outer layer formed externally around the inner layer for use as the support layer of the fiber. The tube may further be provided with a layer formed inside the inner cladding layer for use as part of the core and having a step or graded refractive index.

When optical fiber preforms are fabricated by the conventional RT method from tubes of the last-mentioned type including the inside layer serving as part of core, the interface between the rod and the tube will be positioned in the interior of the core of the optical fiber. The fiber will then involve absorption losses or scattering losses due to the presence of foreign matter at the interior interface and also scattering losses attributable to interface irregularities such as voids. Thus it is almost infeasible to produce low-loss optical fibers by the usual RT method, whereas fully acceptable low-loss optical fibers can be fabricated according to this invention even with the interface between the rod and the tube positioned in the interior of the core because the interface is made almost free from irregularities such as voids.

This enables the RT method, for the first time, to fabricate preforms for giving optical fibers in which the step refractive index profile of the core has a shoulder with a refractive index gradient, whereby the optical fiber is improved to be expanded in its transmission frequency band. Thus the invention has an immense industrial value.

For the fabrication of optical fibers with greatly reduced scattering losses, the rod and the tube to be used in this invention are preferably cleaned over the surfaces thereof before the surface treatment, for example, by treatment with hydrofluoric acid, followed by washing with pure water. Such treatment and washing may be performed conjointly with washing with ultrasonic waves.

According to this invention, the rod is inserted into the tube, and the glass surface treating agent to be described later in detail and oxygen gas are flowed through the clearance between the rod and the tube while the assembly is being heated at a high temperature, whereby the rod and the tube are surface-treated. When the surface treatment is conducted at low temperature, the surfaces will not be treated satisfactorily, failing to fulfill the object of the invention. Accordingly the surface treatment is conducted at a temperature of at least about 700° C., preferably at least about 1,000° C., more preferably at least about 1,200° C. The surface treating temperature is expressed as the temperature of the outer surface of the tube. Although the treatment can be conducted at higher temperature than the foregoing temperature, provided that the rod and the tube will not be softened or deformed, the preferred temperatures are up to about 1,900° C. since higher temperatures may greatly alter the amount and distribution of the dopant, if present, in the rod or the tube.

The assembly of the rod and the tube can be heated by any desired method, for example, by slowly moving a heat source such as oxyhydrogen flame reciprocally or repeatedly in parallel with the center axis of the rod while rotating the assembly about the axis. This heating method is especially preferable for use in this invention. The heat source is moved preferably at a speed of about 10 to about 500 mm/min., more preferably about 50 to about 300 mm./min., while the assembly is being rotated at a speed, for example, of about 10 to about 100 r.p.m., so that the tube and the inside rod can be fully heated to the specified temperature uniformly circumferentially at the portion where they are heated by the heat source.

The glass surface treating agents used in this invention are those which satisfy the following criteria: (i) the hydrogen content thereof being not more than about 1% by weight, and (ii) the substances, produced therefrom in the presence of oxygen gas at a high temperature, having a boiling point or sublimation point of not more than the temperature required for collapsing the tube.

When glass surface treating agents with a hydrogen content of more than about 1% by weight are used, OH groups become incorporated into the opposed surfaces of the rod and the tube during the surface treatment, causing increased absorption losses due to the presence thereof and consequently making it difficult to fabricate low-loss optical fibers. The lower hydrogen content of the glass surface treating agent, the lower absorption loss due to the OH groups. Thus the glass surface treating agents to be used in this invention preferably have a hydrogen content of not more than about 0.1% by weight.

The glass surface treating agents used in this invention must be those which, when heated to a high temperature in the presence of oxygen gas, will not produce any substance having a boiling point or sublimation point higher than the temperature required for collapsing the tube, because the product deposited on the opposed surfaces of the rod and the tube would otherwise remain at the interface therebetween after the collapsing, and give rise to irregularities and spots of abnormal refractive index at the interface, causing increased scattering losses. Accordingly it is critical that the product be almost completely vaporized off at least while the tube is collapsed with application of heat. This can be achieved when the glass surface treating agents fulfil the foregoing requirement. Even when the treating agents give a solid or liquid product which partly remains on the surface of the rod or tube after the completion of the surface treatment, the product will immediately vaporize off when the rod and the tube are heated to a high temperature for collapsing if vaporizable at such a high temperature. Consequently the product is eventually removable from the clearance between the rod and the tube without forming an uneven layer or remaining as foreign matter at the interface between the rod and the tube joined together.

The temperature required for collapsing a tube refers to the temperature at which the tube is collapsed for heat-adhering the rod and the tube together (collapsing temperature, the temperature of the outer surface of the tube in collapsing). In the case of silicate glass, this temperature is about 1,900° to about 2,300° C.

To assure complete vaporization of the product, it is desirable to use glass surface treating agents which will afford a product having a boiling point or sublimation point lower than the collapsing temperature, for example, by at least about 200° C.

According to the investigations of the present inventors on the reason why the surface treatment of this invention realizes a rod-tube-interface free from imperfections, it appears that the outstanding result is attributable to the following reasons.

When the glass surface treating agent in the form of a gas and oxygen gas are flowed through the clearance between the rod and the tube which are heated at a high temperature, a substance freshly formed in the presence of oxygen gas at the high temperature is uniformly incorporated into the opposed surface layers of the rod and tube by diffusion, dissolution, chemical reaction with the glass, etc, whereby the thin surface layer of each of the rod and the tube is modified to a glass layer containing the substance (product). The rod and tube surface layers thus modified are therefore given enhanced chemical affinity for each other or a reduced glass viscosity, and the collapsing of the tube following the surface treatment produces a satisfactory interface free from the defects such as voids which would cause scattering losses.

Besides the mechanism of the surface treatment mentioned above, some kinds of the surface treating agents also clean up the opposed surface layers of the rod and the tube by the following mechanism.

In this mechanism, the substance formed from the agent at the heated portion while the assembly is being heated by a travelling heat source, will not be deposited on the heated portion but flows to a low-temperature portion downstream therefrom and becomes deposited on the rod and tube surfaces at that portion. Foreign matter, if present on the surface, is then enclosed in the deposition. When the travelling heat source reaches the low-temperature portion, the product on the surfaces vaporizes off upon exposure to the high temperature, with the result that the foreign matter is also separated from the surface by the vaporizing pressure of the product and washed away downstream along with the vapor. This phenomenon takes place repeatedly with the travel of the heat source, progressively moving the foreign matter downstream to finally remove the foreign matter from the rod and tube surfaces.

Furthermore, besides the above-mentioned substance-incorporation mechanism, other kinds of surface treating agents also clean up the opposed surface layers of the rod and the tube by etching mechanism, wherein the agents remove the thin surface layers by chemical etching to make new, clean surface layers (which are of course affined chemically due to the incorporation of the substances).

Since the surface treatment of this invention is effected by the passage of the glass surface treating agent in the form of a gas conjointly with oxygen gas, it is preferable that the glass surface treating agents used in this invention have such a vapor pressure that they are flowable in the form of a gas, namely that they can be mixed at the surface treating temperature with oxygen gas at least in the ratio to be stated later. Further if the treating agents can be transported at low temperatures as admixed with oxygen gas, the conduit for the gas mixture can be heat-insulated with ease in order to prevent the dewy deposition. From this viewpoint, it is preferable to use glass surface treating agents having sufficient vapor pressure at low temperatures, more specifically a vapor pressure of at least 10 mmHg at 300° C.

Since the substrate resulting from the surface treating agent is incorporated into the rod and the tube by the surface treatment of this invention, it is of course objectionable if the surface treating agent contains an element exhibiting characteristic absorption at or near the wavelength of the light to be transmitted by the resulting optical fiber.

The glass surface treating agents used in this invention are not particularly limited in their component elements and chemical structure insofar as they fulfil the requirements stated in detail above.

Preferable glass surface treating agents for use in this invention are those which give products being able to be present stably in the silicate glasses of the rod and the tube.

Examples of such products are glass forming oxides which can singly form a stable glass network, and satisfy the well-known glass forming criteria of Zachariasen (as described, for example, in T. Moritani et al, "Glass Technology Hand-Book", 10th ed. Tokyo, Asakura-Shoten, 1973, Page 5). Preferable examples of the glass forming oxides are those having a bonding strength (Kcals.) (the value of dissociation energy of oxide (kcals.) divided by the coordination number thereof) of at least about 60, such as oxides or boron, phosphorus, selenium, arsenic, antimony, etc.

Also preferable, as the above products, are glass modifying oxides which have no glass forming ability, but can be present stably as incorporated in a glass network to modify the characteristics of the glass, as described in the above literature at pages 5 to 6. Preferable examples of the glass modifying oxides are those having a bonding strength (kcals.) of about 10 to about 60.

Therefore, preferable, as the glass surface treating agent, are those materials which contain in their chemical structure an element being able to form the glass forming oxide or glass modifying oxide mentioned above.

Boron and phosphorus are preferable among these elements. Although halogens and sulfur generally are not considered to be elements which form glass forming oxides or glass modifying oxides, these elements are preferable as the constituents of the glass surface treating agents of this invention. Especially preferable are fluorine and chlorine, of which fluorine is more suitable.

Examples of the specific glass surface treating agents containing such an element are $BF_3$, $BCl_3$, $BBr_3$, $BI_3$, $BHF_2$, $BHCl_2$, $B(CH_3O)_3$ and like boron compounds; $PCl_2$, $PBr_2$, $PI_2$, $PF_3$, $PCl_3$, $PBr_3$, $PI_3$, $PF_5$, $PCl_5$, $PBr_5$, $PI_5$ and like phosphorus halides; $POCl_3$ and like phosphorus oxychlorides; $(PNCl_2)_3$, $(PNCl_2)_4$, $(PNCl_2)_5$, $(PNCl_2)_6$, $(PNCl_2)_7$ and like phosphonitrile chlorides; $AsF_3$, $AsCl_3$, $AsBr_3$, $AsF_5$ and like arsenic halides, $SbF_3$, $SbCl_3$, $SbBr_3$, $SbF_5$, $SbCl_5$ and like antimony halides; $S_2F_2$, $S_2Cl_2$, $S_2Br_2$, $SF_2$, $SCl_2$, $SF_4$, $SF_6$ and like sulfur halides; $SO_2$ and like sulfur compounds; $SOF_2$, $SOCl_2$, $SOBr_2$, $SO_2F_2$, $SO_2Cl_2$, $SO_2(OH)F$, $S_2O_5Cl_2$, $SO_2(OH)Cl$, $SO(OH)F$ and like sulfur oxyhalides; $SeF_4$, $SeF_6$, $Se_2Cl_2$, $SeCl_4$, $Se_2Br_2$, $SeBr_4$ and like selenium halides, $CCl_2F_2$, $CCl_3F$, $CClF_3$ and like chlorofluorocarbons; $CF_4$, $CCl_4$, $CBr_4$ and like carbon tetrahalides; $F_2O$, $Cl_2O$, $ClO_2$ and like oxygen halides; $ClF$, $ClF_3$, $BrF$, $BrF_4$ and like compounds of halogens; $F_2$, $Cl_2$, $Br_2$ and like halogens; etc. These substances may be used singly, or at least two of them are usable in admixture. The substances having a hydrogen content of more than about 1% by weight must be used in admixture with other substances so that the mixture will be not more than about 1% by weight in hydrogen content. Preferable compounds as glass surface treating agents are $BCl_3$, $BF_3$, $BBr_3$, $PCl_3$, $PF_3$, $POCl_3$, $CCl_2F_2$, $CClF_3$, $F_2$, $SF_6$, etc.

The glass surface treating agent is fed in the form of a gas to the clearance between the rod and the tube as admixed with oxygen gas in the ratio of preferably about 0.1 to about 200 parts (by volume, the same as hereinafter), more preferably about 0.5 to about 100 parts, especially more preferably about 1 to about 50 parts, of the treating agent per 100 parts of oxygen gas.

According to this invention, satisfactory effects can be achieved merely by treating the thin surface layers of the rod and the tube. The time required for the surface treatment varies depending upon the total pressure and flow rate of the gas mixture of the treating agent and oxygen gas, the concentration of the agent in the mixture, etc., with the tendency that the greater total pressure and flow rate and the higher concentration of the agent, the shorter treating time. When the gas mixture is used at a total pressure of about 100 to about 5,000 mmHg at a flow rate of about 20 to about 5,000 ml./min. and contains about 0.1 to about 1,000 parts of the treating agent per 100 parts of oxygen gas, in combination with a travelling heat source, the heat source is repeatedly or reciprocally moved a required number of times at a speed within the aforementioned range. The heat source is repeatedly or reciprocally moved usually one to about 100 times.

In the case where any other heat means than the above is employed, for example, heating means of non-travelling type, such as an electric furnace wherein the assembly is heated as a whole, the surface treatment is conducted for the period of time equivalent to the total period of time for which the assembly is heated by means of the above-mentioned travelling heat source at a temperature sufficient to surface-treat.

In the preferable embodiments of the invention, the gas mixture is used at a total pressure of about 500 to about 1,000 mmHg at a flow rate of about 50 to about 2,000 ml./min., and contains about 0.5 to about 200 parts, more preferably about 0.5 to about 100 parts of the treating agent per 100 parts of oxygen gas, in combination with the travelling heat source, and the heat source is moved at a speed within the aforementioned range one to about 20 times.

The surface-treated rod and tube are subsequently joined together in a usual manner, for example, by heating the tube at about 1,900° to about 2,300° C. with an oxyhydrogen flame or like heat source while rotating the rod and the tube at the same time as arranged concentrically with each other to collapse the tube with the heat and flame and intimately heat-adhere them together. In this way, an optical fiber preform can be fabricated according to the invention.

The optical fiber preforms fabricated by the method of this invention can be made into optical fibers by a usual method, for example, by drawing the preform at a speed of about 10 to about 100 m./min. to an outside diameter of about 100 to about 200 μm. while heating the preform in an electric furnace.

The rod and the tube subjected to the specific surface treatment of this invention can be joined together satisfactorily, giving an optical fiber preform with greatly reduced interface imperfections as compared with those fabricated by the conventional RT method. Accordingly the preforms fabricated by the instant method afford low-loss optical fibers which are comparable to those obtained by the CVD method. Thus the present invention has made possible the mass production of low-loss optical fibers by the RT method for the first time.

The method of this invention will be described below with reference to Examples and Comparative Examples.

EXAMPLE 1

By the CVD method disclosed in Japanese Patent Application Disclosure (Tokkyo Kokai) No. 120352/1975, a tube of 80 cm. in length and 15.4 mm. in inside diameter was prepared which comprised a support tube made of a silicate glass having $n_D^{20}$ of 1.4585 and measuring 20 mm. in outside diameter and 1.5 mm. in thickness, and a 0.8 mm. thick cladding layer formed on the inner surface of the support tube and made of a silicate glass of 1.4485 in $n_D^{20}$ and doed with boron and fluorine. The tube was used immediately after preparation.

A rod of 8 mm. in outside diameter and made of a high-purity silicate glass of 1.4585 in $n_D^{20}$ was washed over the surface with a 30% by weight hydrofluoric acid, then thoroughly rinsed in pure water with application of ultrasonic waves and thereafter inserted into the tube concentrically therewith. A mixture of oxygen gas and $BCl_3$ gas [$O_2/BCl_3=800/20$ (volume ratio, the same as hereinafter), total pressure =760 mmHg at room temperature] was continuously fed to the clearance between the rod and the tube at a flow rate of 800 ml./min. while the rod and the tube were being rotated at the same time about the center axis at a speed of 60 r.p.m. Simultaneously with this, an oxyhydrogen flame was reciprocally moved 10 times in parallel with the tube at a speed of 100 mm./min. to heat the assembly for surface treatment. The outer surface of the tube at the portion where it was heated with the flame had a temperature of about 1,500° C. as measured by an infrared thermometer.

While continuously rotating the rod and the tube at the same time about the axis at a speed of 60 r.p.m. after the surface treatment, the tube was heated to 2,000° C. with the oxyhydrogen flame and collapsed to obtain an intermediate preform of 17 mm. in outside diameter.

For the adjustment of the outside diameter, the intermediate preform was covered with a silicate glass tube of 25 mm. in outside diameter and 1.5 mm. in thickness, and the tube was then collapsed in the same manner as above to obtain an optical fiber preform of 20.5 mm. in outside diameter. The preform was further fire-polished with the oxyhydrogen flame to an adjusted outside diameter of 20 mm.

The optical fiber preform was then drawn at a speed of 30 m./min. while being heated at 2,000° C. in a carbon resistance furnace to obtain an optical fiber of 60 μm. in core diameter, 15 μm. in cladding thickness and 150 μm. in fiber outside diameter. The fiber was subjected to precoating with urethane resin over the fiber and thereafter to jacket with nylon over the precoat layer. The optical fiber was thus finished to an outside diameter of 0.9 mm. The optical fiber had the loss characteristics shown in Table 1, namely very low losses. The scattering loss listed in Table 1 was determined from the loss characteristics curve of the fiber according to the $\lambda^{-4}$ indication method (in which the reciprocal of the fourth power of wavelength $\lambda$ is plotted as abscissa vs. the total loss (dB/km.) of the fiber as ordinate, and there is adopted, as the scattering loss, the total loss (dB/km.) at an infinite wavelength which is determined by extrapolating the linear portion of the curve in the wavelength range of 0.65 to 0.85 μm. to an infinite wavelength). Such a loss value is independent of wavelength and is generally accepted as being indicative of the scattering loss.

EXAMPLES 2 to 8 and Comparative Examples 1 to 3

The procedures of Example 1 were repeated to fabricate optical fiber preforms and optical fibers except that the glass surface treating agents listed in Table 1 were used as admixed with oxygen gas in the varying ratios shown in the table and that no surface treatment was conducted in Comparative Example 1. The rods used were obtained from the same lot as those used in Example 1, and each of the support tubes having the cladding layer used was the same as one used in Example 1. Accordingly the rods as well as the support tubes having the cladding layer were identical in dimensions and refractive index with those used in Example 1.

In Comparative Example 2, the substance formed by the surface treatment was found to have remained at the interface between the rod and the tube without vaporizing off when the tube was collapsed.

Table 1 shows the loss characteristics of the optical fibers fabricated.

EXAMPLES 9 to 14 and Comparative Examples 4 to 6

The procedures of Example 1 were repeated to fabricate optical fiber preforms and optical fibers except that the cladding layer was made from a silicate glass doped with boron and having $n_D^{20}$ of 1.4510 and that the glass surface treating agents listed in Table 1 were used as admixed with oxygen gas in the varying ratios shown in the table.

In Comparative Example 5 as in Comparative Example 2, the substance formed by the surface treatment was found to have remained at the interface between the rod and the tube. Further in Comparative Example 6, the tube was not satisfactorily heat-adhered to the rod during collapsing due to the deposition of $SnO_2$.

Table 1 shows the loss characteristics of the optical fibers fabricated.

Since the rods used in Examples 1 to 8 and Comparative Examples 1 to 3 were obtained from the same lot and the support tubes having the cladding layer used in Examples 1 to 8 and Comparative Examples 1 to 3 were the same, as already mentioned, the differences in scattering loss between the optical fibers fabricated in these Examples and Comparative Examples appear attributable mainly to the defects produced at the interface between the rod and the tube. This is the case for the differences in scattering loss between the optical fibers fabricated in Examples 9 to 14 and Comparative Examples 4 to 6.

TABLE 1

| | Kind of glass surface treating agent, and ratio of $O_2$ to the agent | Loss characteristics of optical fiber | |
|---|---|---|---|
| | | Loss at wavelength of 0.85 μm. (dB/km.) | Scattering loss (dB/km.) |
| Example | | | |
| 1 | $O_2/BCl_3$ = 800/20 | 2.6 | 0.4 |
| 2 | $O_2/BF_3$ = 800/20 | 2.8 | 0.6 |
| 3 | $O_2/BF_3$ = 800/200 | 2.7 | 0.5 |
| 4 | $O_2/BBr_3$ = 800/50 | 2.9 | 0.7 |
| 5 | $O_2/PCl_3$ = 800/20 | 2.9 | 0.7 |
| 6 | $O_2/POCl_3$ = 800/20 | 2.7 | 0.5 |
| 7 | $O_2/SO_2$ = 800/200 | 3.2 | 0.9 |
| 8 | $O_2/SOCl_2$ = 800/200 | 3.0 | 0.8 |
| 9 | $O_2/CCl_2F_2$ = 800/200 | 2.5 | 0.3 |
| 10 | $O_2/CF_4$ = 800/200 | 2.6 | 0.4 |
| 11 | $O_2/SF_6$ = 800/200 | 2.9 | 0.6 |
| 12 | $O_2/F_2$ = 800/50 | 3.0 | 0.8 |
| 13 | $O_2/BCl_3/CCl_2F_2$ = 800/50/100 | 2.9 | 0.7 |
| 14 | $O_2/CCl_2F_2/AsF_3$ = 800/100/50 | 3.2 | 1.0 |
| Com. Ex. 1 | No surface treatment | 7.8 | 5.5 |
| 2 | $O_2/SiCl_4/BCl_3$ = 800/150/30 | 9.0 | 6.7 |
| 3 | $O_2/BH_3$ = 800/200 | 7.5 | Increased absorption loss due to OH |
| 4 | $O_2$ only | 6.9 | 4.7 |
| 5 | $O_2/GeCl_4$ = 800/20 | 80 | 77 |
| 6 | $O_2/SnCl_4$ = 800/20 | — | — |

Table 1 shows that the optical fibers fabricated in Examples 1 to 14 have lower scattering losses than those produced in Comparative Examples 1 to 6, indicating that the rod and the tube can be joined together very satisfactorily according to the metnod of this invention.

EXAMPLES 15 to 16

For the fabrication of optical fiber preforms and optical fibers, the procedures of Example 3 were repeated for Example 15 and the procedures of Example 5 were repeated for Example 16, except that silicate glass rods of the graded index type were used which had $n_D^{20}$ of 1.4605 in the center of the rod and $n_D^{20}$ of 1.4585 at its surface. The optical fibers produced in Examples 15 and 16 had losses (dB/km.) of 3.3 and 3.5, respectively, at a wavelength of 0.85 μm. and scattering losses (dB/km.) of 0.8 and 1.2, respectively.

EXAMPLE 17

A tube of 50 cm. in length and 15.4 mm. in inside diameter was prepared by the CVD method. The tube comprised a support tube made of a silicate glass having $n_D^{20}$ of 1.4585 and measuring 20 mm. in outside diameter and 1.5 mm. in thickness, and a 0.8 mm. thick cladding layer formed on the inner surface of the support tube and made of a silicate glass of 1.4550 in $n_D^{20}$ and doped with boron. The tube was used immediately after preparation.

A rod of 1 mm. in outside diameter and made of a high-purity silicate glass having $n_D^{20}$ of 1.4585 was cleaned in the same manner as in Example 1.

The rod and the tube were subsequently subjected to surface treatment and collapsing operation in the same manner and under the same conditions as in Example 1 to obtain an intermediate preform. For the adjustment of the outside diameter, the intermediate preform was covered with a silicate glass tube of 25 mm. in outside diameter and 2.5 mm. in thickness, and the tube was then collapsed and adjusted to an outside diameter of 21.5 mm. in the same manner as in Example 1 to prepare an optical fiber preform.

The optical fiber preform was drawn at a speed of 30 m./min. while being heated at 2,000° C. in a carbon resistance furnace to obtain an optical fiber of 7 μm. in core diameter, 35 μm. in cladding thickness and 150 μm. in fiber outside diameter. A precoat layer and a jacket layer were further formed on the fiber in the same manner as in Example 1.

The optical fiber thus fabricated had a loss of 2.4 dB/km. at a wavelength of 0.85 μm. and a scattering loss of 0.2 dB/km.

EXAMPLE 18

A 0.4 mm. thick first layer serving as a cladding and made of a silicate glass doped with boron and fluorine and having $n_D^{20}$ of 1.4485 was formed by the CVD method on the inner surface of the same support tube as used in Example 1. A 0.8 mm. thick doped silicate glass second layer serving as part of a core was similarly formed by the CVD method over the first layer, the second layer having a refractive index gradient such that the second layer had, at one side thereof in contact with the first layer, a refractive index equal to that of the first layer and the same refractive index of 1.4585 as a pure silicate glass at the other side thereof. An optical fiber preform and an optical fiber were fabricated in the same manner as in Example 1 except that the tube prepared as above was used with another exception that the rod (a pure silicate glass, $n_D^{20}$: 1.4585) had an outside diameter of 5 mm.

The optical fiber obtained had a loss of 3.0 dB/km. at a wavelength of 0.85 μm. and a scattering loss of 0.7 dB/km.

EXAMPLE 19

An optical fiber preform and an optical fiber were fabricated in the same manner as in Example 18 except that the rod (a pure silicate glass, $n_D^{20}$: 1.4585) had an outside diameter of 1 mm.

The optical fiber obtained has a loss of 2.8 dB/km. at a wavelength of 0.85 μm., a scattering loss of 0.5 dB/km. and a frequency band width of 900 MHz.

What we claim is:

1. In a method of fabricating an optical fiber preform by inserting a silicate glass rod into a silicate glass tube and collapsing the tube by heating the resulting assembly, the improvement which comprises, before the tube is collapsed flowing a glass surface treating agent and oxygen gas through the clearance between the rod and the tube while the assembly is heated at a high temperature to produce substances which effect removal of foreign material and cure of surface defects on the surfaces of said rod and tube; said glass surface treating agent: (a) satisfying the following criteria: (i) the hydrogen content thereof being not more than about 1% by weight, and (ii) the substances produced therefrom in the presence of oxygen gas at the high temperature having a boiling point or sublimation point of not more than the temperature required for collapsing the tube so that the substances are substantially removed from the clearance between the surfaces of the rod and the tube before or during collapsing of the tube, and (b) being employed in an amount of at least 0.1 part by volume per 100 parts by volume of oxygen gas.

2. The method of claim 1, wherein the glass surface treating agent and oxygen gas are flowed while the assembly is heated at a temperature of at least about 1,000° C. at the outer surface of the tube.

3. The method of claim 1 or 2, wherein the hydrogen content of the glass surface treating agent is not more than about 0.1% by weight.

4. In a method of fabricating an optical fiber preform by inserting a silicate glass rod into a silicate glass tube and collapsing the tube by heating the resulting assembly, the improvement which comprises, before the tube is collapsed, flowing a glass surface treating agent and oxygen gas through the clearance between the rod and the tube while the assembly is heated at a high temperature to produce substances which effect removal of foreign material and cure of surface defects on the surfaces of said rod and tube; said glass surface treating agent: (a) satisfying the following criteria: (i) the hydrogen content thereof being not more than about 1% by weight, and (ii) the substances produced therefrom in the presence of oxygen gas at the high temperature having a boiling point or sublimation point of not more than the temperature required for collapsing the tube so that the substances are substantially removed from the clearance between the surfaces of the rod and the tube before or during collapsing of the tube, (b) being employed in an amount of at least 0.1 part by volume per 100 parts by volume of oxygen gas, and (c) containing at least one element selected from the group consisting of elements capable of forming a glass network forming oxide, elements capable of forming a glass modifying oxide, halogens and sulfur.

5. The method of claim 4, wherein the glass surface treating agent contains at least one of boron and phosphorus.

6. The method of claim 4, wherein the glass surface treating agent contains at least one of halogens and sulfur.

7. The method of claim 6, wherein the glass surface treating agent is a compound containing fluorine.

8. The method of claim 3 wherein the glass surface treating agent contains at least one element selected from the group consisting of elements capable of forming a glass network forming oxide, elements capable of forming a glass modifying oxide, halogens and sulfur.

9. The method of claim 8 wherein the glass surface treating agent contains at least one of boron and phosphorus.

10. The method of claim 8 wherein the glass surface treating agent contains at least one of halogens and sulfur.

11. The method of claim 10 wherein the glass surface treating agent is a compound containing fluorine.

12. The method of claim 1, wherein the substance formed from the glass treating agent in the presence of oxygen at the high temperature is an oxide.

13. The method of claim 4, wherein the glass surface treating agent is at least one member selected from the group consisting of boron halides, phosphorus halides, arsenic halides, antimony halides, phosphorus oxyhalides, halogens, sulfur halides, and chlorofluorocarbons.

* * * * *